United States Patent [19]
Zinn

[11] 3,947,320
[45] Mar. 30, 1976

[54] NICKEL CONTAINER OF HIGHLY-ENRICHED URANIUM BODIES AND SODIUM

[75] Inventor: Walter H. Zinn, Hinsdale, Ill.

[73] Assignee: The United States of America as represented by the United States Energy Research & Development Administration, Washington, D.C.

[22] Filed: Apr. 1, 1953

[21] Appl. No.: 346,084

[52] U.S. Cl.................. 176/72; 176/73; 176/91 SP
[51] Int. Cl.² ........................................ G21C 3/22
[58] Field of Search ............ 204/154.2; 176/72, 73, 176/91 SP

[56]         References Cited
         UNITED STATES PATENTS

| | | | |
|---|---|---|---|
| 186,391 | 1/1877 | White ..................................... | 86/29 |
| 477,492 | 6/1892 | Benet.................................... | 102/67 |
| 631,703 | 8/1899 | Dunn .................................... | 102/67 |
| 810,582 | 1/1906 | Stout............................... | 204/154.2 |

FOREIGN PATENTS OR APPLICATIONS

| 648,293 | 1/1951 | United Kingdom............. | 204/154.2 |
|---|---|---|---|

OTHER PUBLICATIONS

Smyth, "A General Account of the Development of Methods of Using Atomic Energy for Military Purposes Under the Auspices of the U.S. Government," Aug. 1945, p. 40.

Goodman, "The Science and Engineering of Nuclear Power," Vol. I, Published by Addison–Wesley Press, Inc., Cambridge, 42, Mass., (1947), pp. 316, 317.

*Primary Examiner*—Samuel Feinberg
*Assistant Examiner*—Peter A. Nelson
*Attorney, Agent, or Firm*—Dean E. Carlson; Arthur A. Churm; Lee P. Johns

[57]            ABSTRACT

A fuel element comprises highly a enriched uranium bodies coated with a nonfissionable, corrosion resistant material. A plurality of these bodies are disposed in layers, with sodium filling the interstices therebetween. The entire assembly is enclosed in a fluid-tight container of nickel.

1 Claim, 9 Drawing Figures

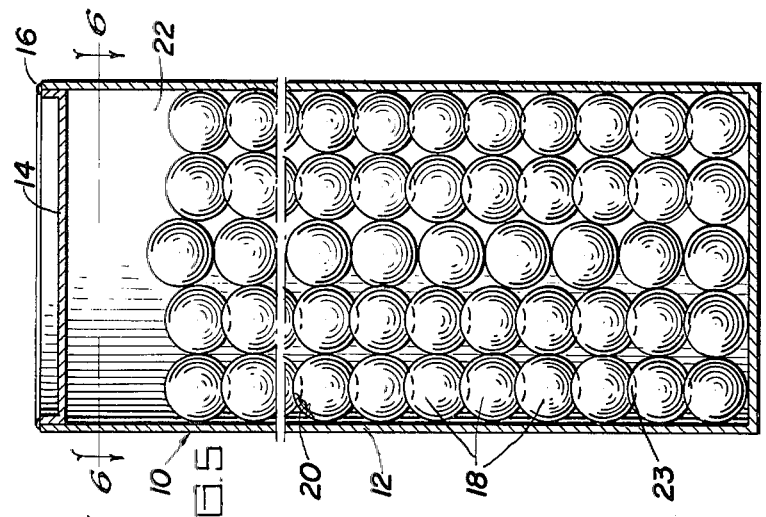
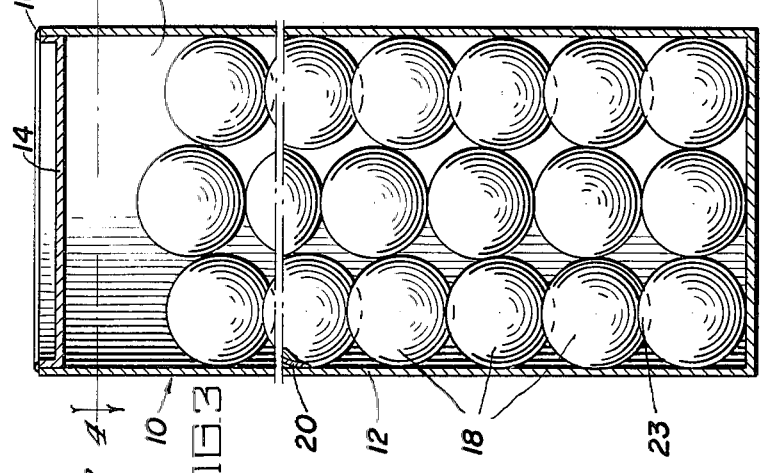
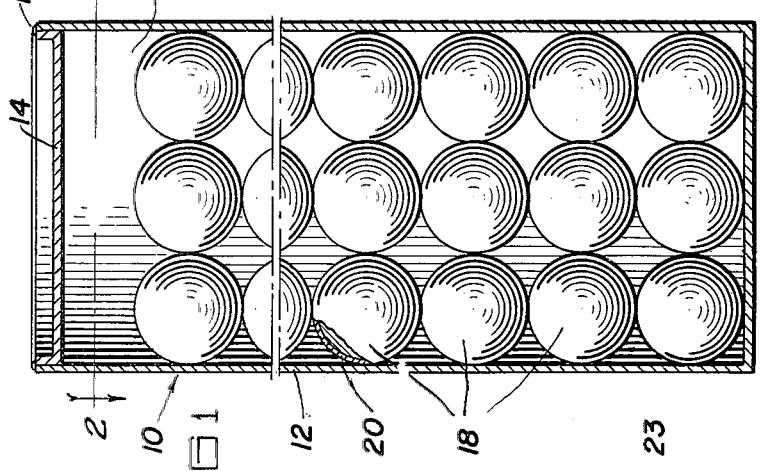
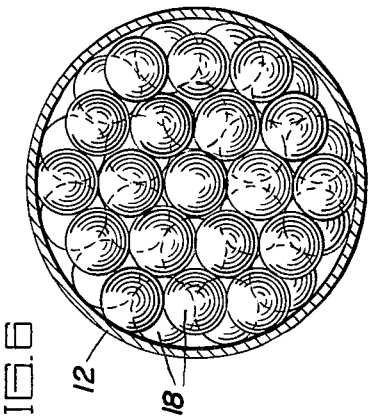
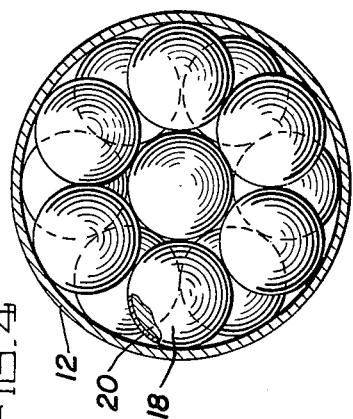
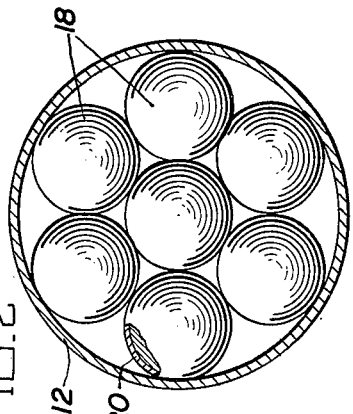

INVENTOR.
Walter H. Zinn
BY
Roland A. Anderson
Attorney

NICKEL CONTAINER OF HIGHLY-ENRICHED URANIUM BODIES AND SODIUM

This invention relates to fuel elements for a neutronic reactor. In particular it pertains to the structural make-up of material containing fissionable isotope for a nuclear reactor.

Reference is made to my copending application, Ser. No. 721,108, filed Jan. 9, 1947 now U.S. Pat. No. 2,975,117 issued Dec. 19, 1960 and to the copending application of Leo Szilard, Ser. No. 698,334, filed Sept. 20, 1946, now U.S. Pat. 3,103,475 issued Sept. 10, 1963, for a showing of the type of reactors involved.

This invention involves a partial departure from conventional fuel elements having a single cylindrical body of material containing a fissionable isotope, such as uranium. Such a body is difficult and costly to manufacture because of the necessity to machine to precise dimensions. Also the body develops undesirable elongated crystals in the direction of rolling operation preceding the step of machining. Further, uranium is a relatively poor heat conductor.

An object of this invention is to provide a structure for material containing fissionable isotope for a reactor, which structure can be manufactured cheaply and easily by such simple operations as stamping or upsetting without a need for machining to accurate size.

Another object is the provision of a structural make-up for material containing fissionable isotope which does not exhibit a pronounced tendency to grow in a single direction.

A further object is to provide a structure of a fuel element for a reactor which structure has improved heat conductivity. This permits the heat of fission generated in the fissionable isotope to be dissipated more repeatedly and consequently the reactor to be operated at a higher specific power.

Other objects and advantages of this invention will, in part, be obvious and appear hereinafter.

For a more complete understanding of the nature and scope of this invention, reference can be had to the following detailed description taken together with the accompanying drawings in which:

FIG. 1 is a vertical sectional view of a first embodiment of the present invention;

FIG. 2 is a horizontal sectional view, taken on the line 2—2 of FIG. 1;

FIG. 3 is a vertical sectional view of a second embodiment of the present invention;

FIG. 4 is a horizontal sectional view taken on the line 4—4 of FIG. 3;

FIG. 5 is a vertical sectional view of a third embodiment of the present invention;

FIG. 6 is a horizontal sectional view taken on the line 6—6 of FIG. 5;

Figure 7:
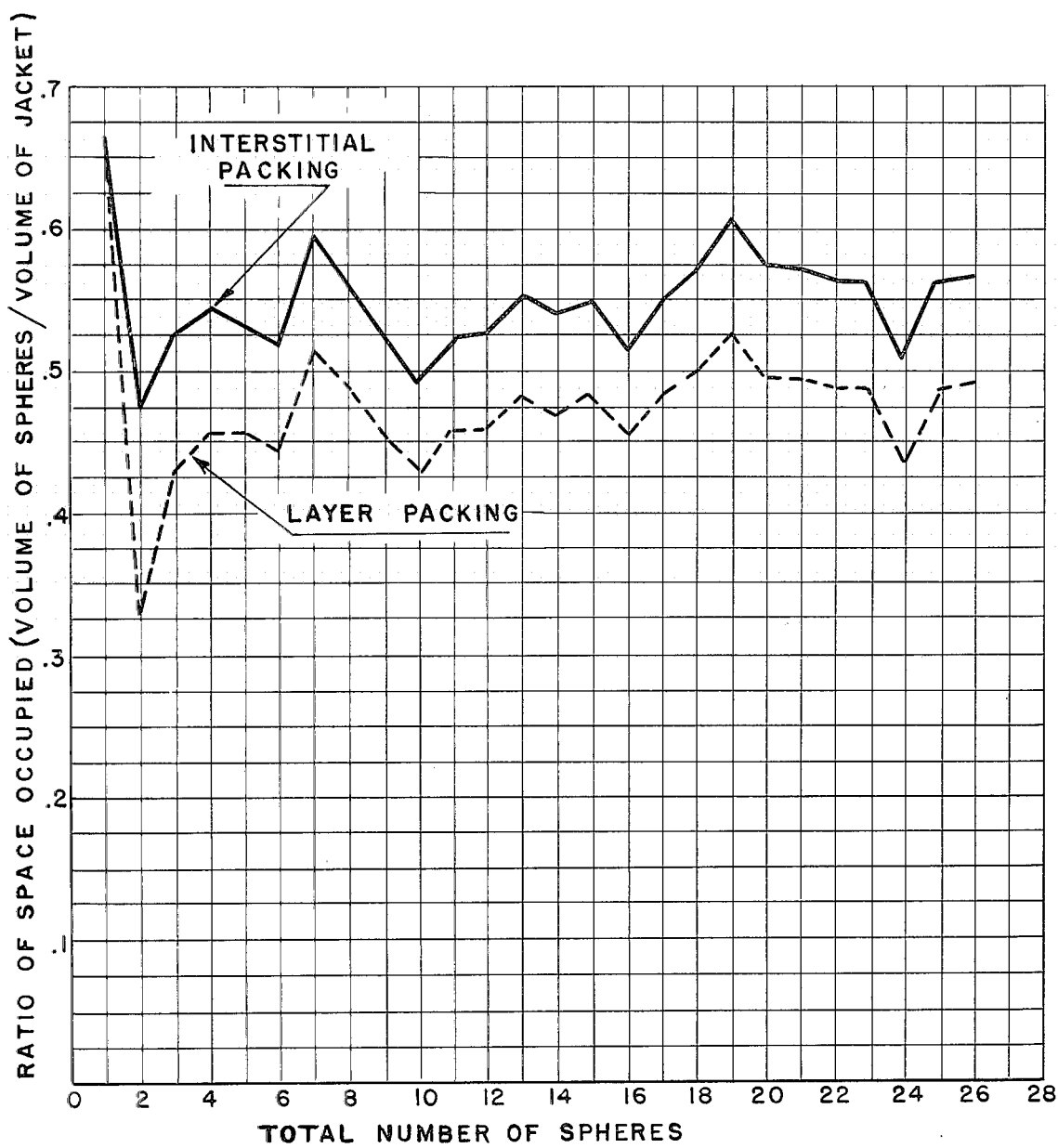
FIG. 7 is a chart in which the ordinate is the ratio of space occupied (volume of spheres/volume of jacket) and the abscissa is the total number of spheres.

In the drawings a fuel element is generally indicated at 10. It is preferably encased in a closed cylindrical jacket 12 having one end covered with a cap 14 in a fluid-tight manner by means of a weld 16 at the upper peripheral interface of the jacket and the cap. The preferred composition of the jacket and cap is nickel, titanium or stainless steel.

Within the jacket 12 is a plurality of solid spheres 18 of fissionable material, i.e., a material containing a fissionable isotope, such as $U^{235}$. $U^{235}$-enriched uranium is used in the fast neutron reactor of my copending application, supra, and the $U^{235}$ content is about 93.5% of total uranium content in a uranium sphere. The spheres may be made by forging short lengths of uranium wire in a two-piece die. Each sphere is provided with a coat 20 of corrosion-resistant material, such as nickel or silver. The purpose of the coat is twofold, namely, to retain the fission gases as much as possible within the particular sphere in which they are generated, and to prevent corrosion of the fissionable material. Inasmuch as the spheres do not occupy the entire volume of the jacket 12, it is proposed that the unoccupied portion be filled with a heat-conducting metal, which is liquid at room temperature or which is easily liquefiable. Sodium is an example of an easily liquefiable heat-conducting metal. Also, a space 22 provided between the top layer of the spheres and the cap 14 is filled with the liquid metal. This space is provided to allow for expansion of the spheres at elevated temperatures.

The majority of the fuel elements for a neutronic reactor preceding this invention have contained solid bodies of fissionable material covered with corrosion-resistant metals, such as aluminum and stainless steel. Most of the fuel elements have used uranium as the fissionable material. Since uranium is not a good thermal conductor compared with other metals, it is evident that a heat gradient would develop between the center and the exterior of the uranium body. This gradient has been a limiting factor in the power output of a reactor using the uranium fuel elements in large masses. Consequently, it is proposed that the uranium be manufactured in bodies having smaller cross-sections in order to reduce the heat gradient within each body. A sphere is the preferred shape due to the ease of manufacture and the largest ratio of surface to volume. By immersing the bodies in a liquid coolant having a comparatively higher coefficient of thermal conductivity than uranium, the heat produced within each sphere is conducted by the coolant to the jacket 12 which is cooled externally.

If we consider that the spheres are die-shaped from short pieces of a length of wire, the growth that will occur in the direction of such length because of the working required to produce the wire will not occur in a single direction on the individual spheres in a given casing, because the balls will not orient themselves in the casing according to the original length.

Having sacrificed volume of fissionable material in each element 10 for the advantage of a lower heat gradient, it is necessary to pack spheres 18 in the jacket 12 as efficiently as possible. It is convenient to make all the spheres of the same size in a given jacket, and this enables the spheres to be packed in layers that extend generally transversely of the jacket 12. Two types of packing are proposed. As shown in FIGS. 1 and 2, the layers are disposed one above the other in such a manner that a sphere of each layer contacts only one sphere in an adjacent layer; that is, the centers of the spheres lie in vertical lines. In FIGS. 3 through 6, however, each sphere contacts two spheres of an adjacent layer; that is, the center of one sphere lies between those of the two spheres upon which is rests. Manifestly, packing the spheres interstitially, as shown at 23 in FIGS. 3 and 5, is a more compact method, because the uppermost point of a sphere on a lower layer is higher than the lowermost point of contiguous spheres in an upper layer.

In FIG. 7 is a graph of two curves showing the variation of cylinder space occupied with the number of spheres. One curve shows the layer packing as set forth with respect to FIGS. 1 and 2, and the other shows the interstitial packing as described with respect to FIGS. 3 through 6. Both curves show that the ratio of space occupied within a jacket is greater where a number of spheres in a given layer is an odd whole number. More precisely, the diameter of the container is an odd multiple of the diameter of the spheres. Hence, the greatest ratio of space occupied is that layer having only one sphere. The next greatest ratios are for seven and nineteen spheres. Although a layer having one sphere is not shown in the drawings, it is evident that the body would have a diameter equal to the inside diameter of the jacket 12 which would be a relatively large mass of uranium having the objectionable high heat gradient alluded to for cylindrical bodies. For this reason a layer having only one sphere has been ignored. The layers having seven and nineteen spheres are shown in the drawings. As shown in FIG. 2 a layer having seven spheres is arranged with a central sphere and six orbital spheres disposed around it. For a layer having nineteen spheres for the same size jacket, spheres having smaller diameters are used. They are disposed, as shown in FIG. 6, so that the central sphere has six spheres around it in an inner orbit and an additional twelve spheres in an outer orbit adjacent the jacket. From the arrangements shown in FIGS. 2, 4, and 6, it is evident that a central sphere is disposed with its center on the jacket axis. In addition, it is pointed out that the inside diameter of the jacket is an odd multiple of the diameter of each sphere.

Due to the fact that the central spheres of each layer are necessarily disposed on the axis of the jacket, these spheres can only be disposed above each other without interstitial packing as set forth in FIGS. 3 and 5. Consequently, the column of central spheres in each figure extends above the surrounding spheres which are interstitially packed.

Figure 9:
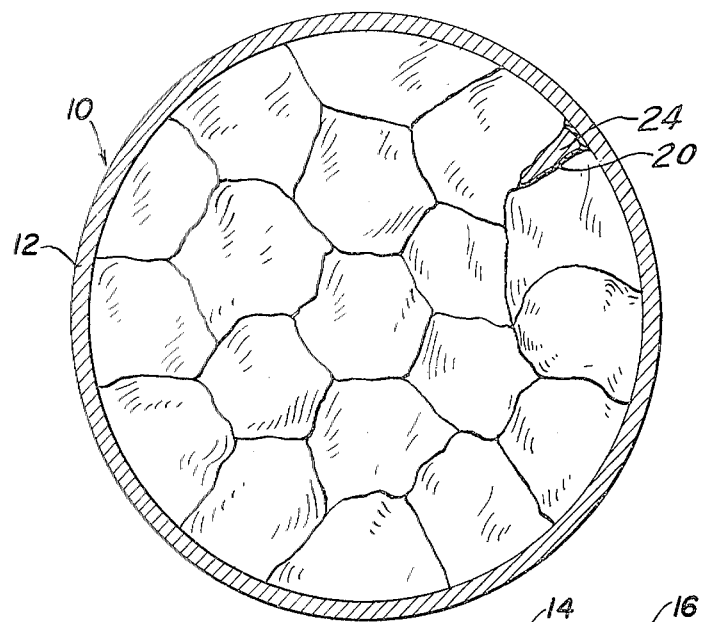
FIG. 9 is a horizontal sectional view taken on the line 9—9 of FIG. 8.
Figure 8:
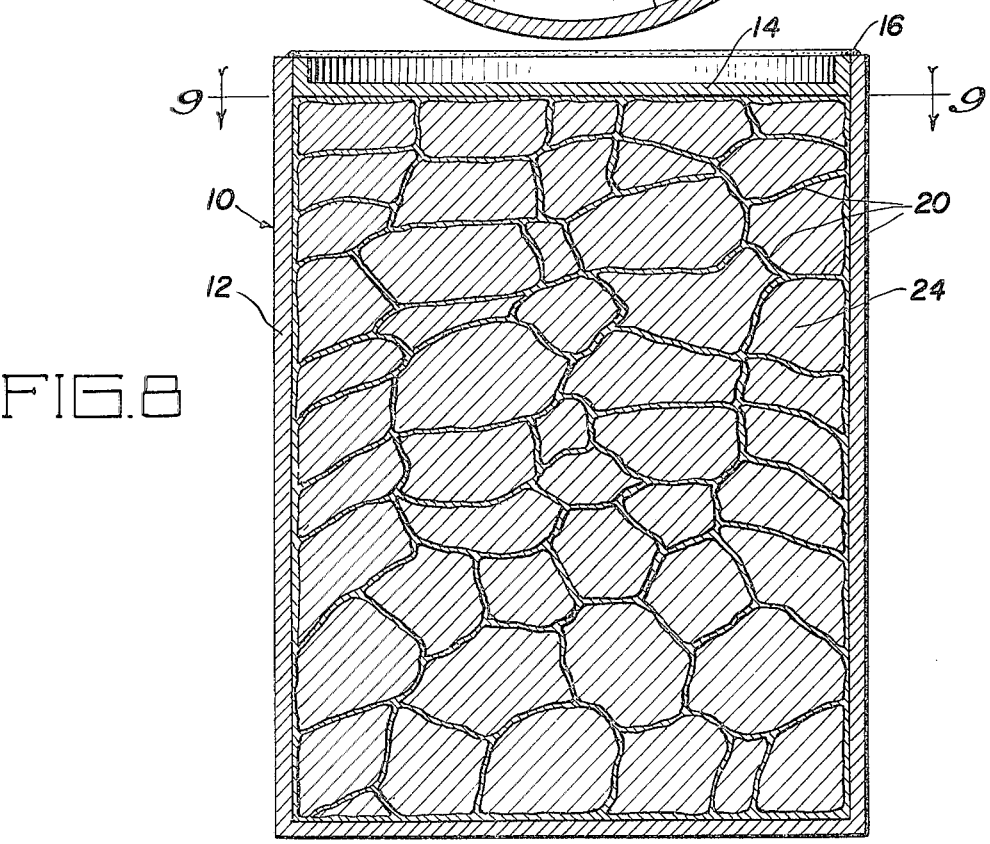
FIG. 8 is a vertical sectional view of a fourth embodiment of the present invention.

In order to increase the ratio of space occupied within each jacket the spheres, after being placed in their layers as set forth in FIGS. 1, 3, and 5, may be subjected to a force great enough to permanently distort the sphere so as to occupy part of the space between the undistorted spheres. In this manner, more spheres may be placed into each jacket. This modification of the invention is shown in FIGS. 8 and 9. The element 10 comprises the jacket 12 and a compact agglomeration 24 of fissionable material which entirely fills the jacket. The agglomeration is the distinguishing feature of this embodiment over the previous ones. In general the agglomeration is formed by pressing a plurality of individually coated spheres into a compact cylinder. Specifically the preferred embodiment is composed of uranium spheres having 0.097 inch diameter and having an exterior coat of nickel or silver. The spheres are placed in a double acting die in vacuo and subjected to sufficient pressure at 450°C. to achieve the proper compactness; that is, 15 tons per square inch. The compact is then ground to 0.400 inch diameter and 0.5246 inch length and inserted into the thin walled jacket 12 in which it is sealed in the manner set forth above for the previous embodiments. If machining removes the coat of nickel or silver, a new coat is applied to the cylinder.

As shown in FIGS. 8 and 9, the spheres flow into all voids assuming various configurations. Each mass of the deformed spheres is contained within its original coat 20, for which reason the coats of adjacent bodies are pressed together so as to appear fused. Hence, the agglomeration 24 is a compact cylinder segregated into a number of parts equal to the original number of spheres by the coats of each sphere.

This form of the invention has the advantage of random orientation of the deformed spheres with respect to the direction of the original length of wire or rod from which the spheres were made. Thus growth due to working of the wire or rod will not be concentrated in a single direction.

Other variations from the preferred methods described will be apparent and may be made without departing from the spirit of and scope of the invention.

What is claimed is:

1. A fuel element for a neutronic reactor comprising a cylindrical fluid-tight container of nickel, a plurality of solid substantially spherical bodies of uranium containing about 93.5% $U^{235}$ within the container a coating of nonfissionable, corrosion-resistant material covering each body, the bodies having substantially equal diameters, the diameter of the container being an odd multiple of the diameter of the bodies, the bodies being disposed in layers between the ends of the container each layer having a central body with two orbits about it, the inner orbit having six bodies and the outer orbit having twelve bodies, and sodium within the container, the sodium and the uranium bodies entirely filling the container.

\* \* \* \* \*